(12) United States Patent
Hueckel et al.

(10) Patent No.: US 9,467,059 B2
(45) Date of Patent: Oct. 11, 2016

(54) ACTIVATION APPARATUS AND METHOD FOR ACTIVATING A DIRECT VOLTAGE CONVERTER

(75) Inventors: Eric Hueckel, Emmendingen (DE); Stefan Koch, Kappelrodeck (DE); Florian Lieblang, Buehl (DE); Stephan Binhack, Karlsruhe (DE); Tobias Pristl, Fuldabrueck (DE); Michael Zeller, Rheinmuenster (DE); Stephan Mueller, Buehl (DE); Jian Tian, Buehl (DE); Ralf Bochat, Waldbronn (DE); Ralf-Peter Bergmann, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 253 days.

(21) Appl. No.: 14/348,505

(22) PCT Filed: Aug. 2, 2012

(86) PCT No.: PCT/EP2012/065148
§ 371 (c)(1),
(2), (4) Date: May 7, 2014

(87) PCT Pub. No.: WO2013/045141
PCT Pub. Date: Apr. 4, 2013

(65) Prior Publication Data
US 2014/0328086 A1   Nov. 6, 2014

(30) Foreign Application Priority Data

Sep. 29, 2011   (DE) .................. 10 2011 083 763

(51) Int. Cl.
| | | |
|---|---|---|
| *H02M 3/335* | (2006.01) | |
| *H02M 3/337* | (2006.01) | |
| *H02M 1/36* | (2007.01) | |
| *H02M 1/00* | (2006.01) | |

(52) U.S. Cl.
CPC ............. *H02M 3/3378* (2013.01); *H02M 1/36* (2013.01); *H02M 3/33592* (2013.01); *H02M 2001/0025* (2013.01); *Y02B 70/1475* (2013.01)

(58) Field of Classification Search
CPC ............... H02M 1/1588; H02M 1/36; H02M 3/33592; H02M 3/337; H02M 3/3378; H02M 2001/0025
See application file for complete search history.

(56) References Cited

U.S. PATENT DOCUMENTS 6,845,018 B2 *  1/2005  Ohishi .............. H02M 3/33507
                                              363/21.06
7,561,450 B2   7/2009  Adragna et al.
(Continued)

FOREIGN PATENT DOCUMENTS

CN        101170278        6/2010

OTHER PUBLICATIONS

International Search Report for Application No. PCT/EP2012/065148 dated Jan. 28, 2013 (English Translation, 2 pages).

*Primary Examiner* — Matthew Nguyen
(74) *Attorney, Agent, or Firm* — Michael Best & Friedrich LLP

(57) ABSTRACT

The invention relates to an activation apparatus (20) for a galvanically decoupled direct voltage converter having a synchronous rectifier, comprising a signal generating device (22), which is designed to generate control signals (22c, 22d) for switch devices of the synchronous rectifier and a reference current signal (22b), a first comparator device (23), which is coupled to the signal generating device (22), and which is designed to detect the secondary-side output current (Jo) of the synchronous rectifier, compare it to the reference current signal (22b) and generate a current control signal in dependence on the comparison, and a pulse width modulation device (25), which is coupled to the signal generating device (22) and the first comparator device (23) and which is designed to generate pulse width modulated activation signals (25a) for the switch devices of the synchronous rectifier on the basis of the control signals (22c, 22d) and the current control signal, wherein the signal generating device (22) is furthermore designed to reduce the reference current signal (22b) within a first predetermined timespan to a predetermined reference current threshold.

10 Claims, 2 Drawing Sheets

(56) References Cited

U.S. PATENT DOCUMENTS

| | | | | |
|---|---|---|---|---|
| 8,040,120 B2* | 10/2011 | Ito | ................ | H02M 3/156 323/285 |
| 8,044,642 B2* | 10/2011 | Sakai | ................ | H02M 3/1588 323/224 |
| 2006/0279966 A1* | 12/2006 | Fan | ................ | H02M 3/337 363/17 |
| 2007/0236192 A1 | 10/2007 | Vo | | |
| 2008/0211465 A1 | 9/2008 | Kung et al. | | |
| 2012/0146599 A1* | 6/2012 | Oyama | ................ | H02M 3/1588 323/271 |

* cited by examiner

ACTIVATION APPARATUS AND METHOD FOR ACTIVATING A DIRECT VOLTAGE CONVERTER

BACKGROUND OF THE INVENTION

The invention relates to an actuation device and to an actuation method for a DC-DC converter, in particular for a push-pull forward converter in a full-bridge circuit.

Synchronous rectifier circuits are usually used for DC-DC conversion, for example for supplying power to a low-voltage electrical system of a vehicle, in the case of push-pull forward converters in full-bridge or half-bridge circuits. The power semiconductor switches, for example MOSFETs, used on both the primary and secondary sides for this purpose must be protected against overvoltages or current levels which are too high.

To actuate active synchronous rectifier circuits, pulse-width signals are provided for this purpose by a microprocessor, which signals are converted, for example by a pulse-width-modulation member, into corresponding PWM actuation signals for the individual semiconductor switches. When a push-pull forward converter is disconnected, it can lead to a secondary-side discontinuous current mode (DCM) owing to the drop in the primary-side supply voltage, which discontinuous current mode can damage the secondary-side semiconductor switches. At the same time, it is possible for the magnetic flux reserve during the generation of the PWM actuation signals to reduce and for an excessive magnetizing current to lead to saturation of the primary side of the transformer of the push-pull forward converter and, as a result, to a reduction in the magnetic inductance, which in turn can constitute a risk of damage for the primary-side semiconductor switches owing to high primary-side currents.

The document U.S. Pat. No. 7,561,450 B2 discloses a protective circuit for a DC-decoupled DC-DC converter, which protective circuit can be used to prevent high currents through semiconductor switches of the DC-DC converter when a load demand on the secondary side of the DC-DC converter exceeds a critical threshold. For this purpose, the energy transfer from the primary to the secondary side is limited for a predetermined time period, after which the protective circuit can safely disconnect the DC-DC converter.

SUMMARY OF THE INVENTION

According to one aspect, the present invention provides an actuation device for a DC-decoupled DC-DC converter having a synchronous rectifier, having a signal-generating device which is designed to generate control signals for switching devices of the synchronous rectifier and a reference current signal, a first comparator device which is coupled to the signal-generating device and which is designed to detect the secondary-side output current of the synchronous rectifier, to compare said secondary-side output current with the reference current signal and to generate a current control signal on the basis of the comparison, and a pulse-width-modulation device, which is coupled to the signal-generating device and to the first comparator device and which is designed to generate pulse-width-modulated actuation signals for the switching devices of the synchronous rectifier on the basis of the control signals and the current control signal, wherein the signal-generating device is also designed to reduce the reference current signal to a predetermined reference current threshold value within a first predetermined time period.

According to another aspect, the present invention provides a system having a push-pull forward converter which comprises a primary-side four-quadrant converter, a transformer, a synchronous rectifier and an LC filter, and an actuation device according to the invention, which is designed to generate pulse-width-modulated actuation signals for semiconductor switches of the four-quadrant converter and the synchronous rectifier.

According to another aspect, the present invention provides a method for actuating a DC-decoupled DC-DC converter having a synchronous rectifier, comprising the steps of generating pulse-width-modulated actuation signals for switching devices of the synchronous rectifier on the basis of a reference current signal, the value of which limits an output current of the synchronous rectifier, receiving a switch-off signal for the DC-DC converter, and, once the switch-off signal has been received, reducing the reference current signal to a predetermined reference current threshold value within a first predetermined time period.

One concept of the present invention is to actuate primary-side and/or secondary-side switching devices of a DC-decoupled DC-DC converter such that critical operating states of the DC-DC converter are already avoided by means of the pulse-width modulation of the actuation signals. In this case, in particular when the DC-DC converter is switched off, the transition from a continuous current mode (CCM) to a discontinuous current mode (DCM) is intended to be avoided by virtue of the output current of the synchronous rectifier of the DC-DC converter gradually being restricted before the DC-DC converter is switched off. In this way, it is possible to prevent the occurrence of return currents in the secondary-side storage inductor through the secondary-side switching devices in the event of a reduction in the primary-side supply voltage of the DC-DC converter.

Another concept of the present invention is simultaneous gradual restriction of the output voltage of the synchronous rectifier such that the duty cycle of the pulse-width modulation is not at a maximum in the event of a reduction in the primary-side supply voltage and thus the magnetic flux reserve is not completely depleted, which could otherwise lead to saturation of the transformer.

A significant advantage of the invention is that additional devices for detecting undervoltages on the primary side or undercurrents on the secondary side can be dispensed with. At the same time, the dependability and the efficiency of the DC-DC converter are not compromised, since return currents through the storage inductor and saturation effects of the transformer can be avoided by means of the actuation strategy according to the invention.

In an advantageous embodiment, the DC-decoupled DC-DC converter can be a bidirectional push-pull forward converter having a primary-side full-bridge circuit. In particular, DC-DC converters of this type can advantageously be used for high-power applications in electrically driven vehicles or hybrid vehicles.

In an advantageous embodiment, the signal-generating device can also be designed to receive a switch-off signal for the DC-DC converter. Hence, the DC-DC converter can advantageously be switched off in a controlled manner while reducing the reference current signal to the predetermined reference current threshold value once the switch-off signal has been received. This offers the advantage that no secondary-side discontinuous current mode occurs in the event of a drop in the primary-side supply voltage, and hence no disturbing return currents through the storage inductor or the secondary-side switching devices of the synchronous rectifier can occur.

In an advantageous embodiment, the signal-generating device can also be designed to generate a reference voltage signal and to reduce the reference voltage signal to a predetermined reference voltage threshold value within a second predetermined time period, wherein the actuation device also comprises a second comparator device which is coupled to the signal-generating device and which is designed to detect the secondary-side output voltage of the synchronous rectifier, to compare said secondary-side output voltage with the reference voltage signal and to generate a voltage control signal on the basis of the comparison, and wherein the pulse-width-modulation device is also designed to generate pulse-width-modulated actuation signals for the primary-side switching devices of the DC-DC converter on the basis of the voltage control signal. As a result, saturation of the transformer is advantageously avoided since the duty cycle of the pulse-width modulation does not hit the maximum upper limit even in the event of a switch-off process of the DC-DC converter.

In this case, the signal-generating device can also be designed to reduce the reference voltage signal to the predetermined reference voltage threshold value once the switch-off signal has been received. Therefore, the voltage on an input capacitor of the DC-DC converter can be effectively decreased before the DC-DC converter is switched off, without an additional discharge circuit being necessary.

BRIEF DESCRIPTION OF THE DRAWINGS

Further features and advantages of embodiments of the invention emerge from the following description with reference to the appended drawings.

In the drawings.

DETAILED DESCRIPTION

Figure 1:
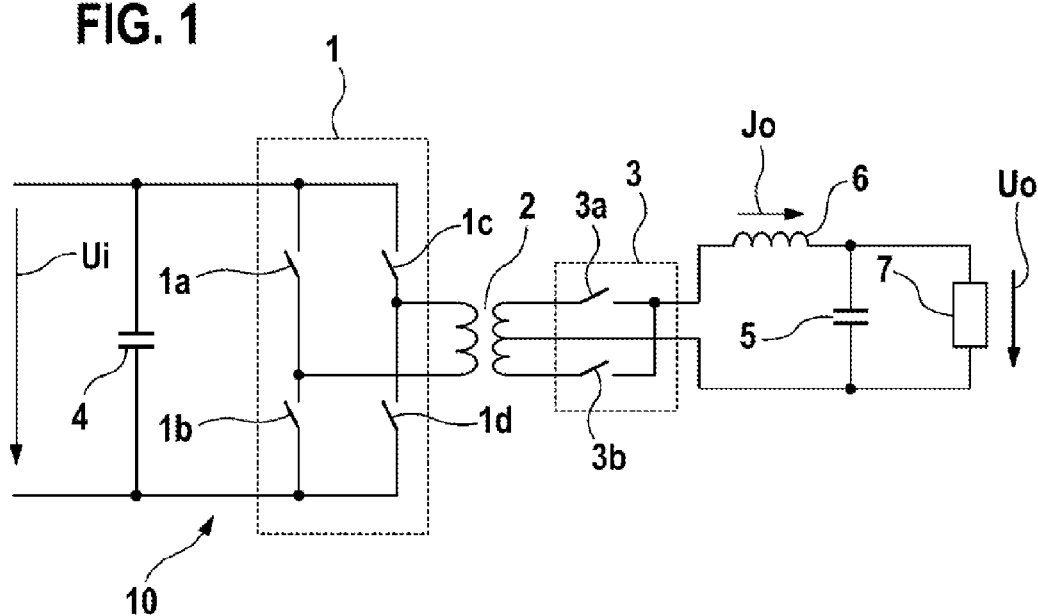
FIG. 1 shows a schematic illustration of a DC-decoupled DC-DC converter according to an embodiment of the invention.

FIG. 1 shows a schematic illustration of a DC-DC converter 10. The DC-DC converter 10 comprises a transformer 2 having a primary-side winding and a secondary-side winding, which is divided into two sections by means of a center tap. The transformer 2 can be designed, for example, to convert a high voltage into a low voltage and can have, for example, a turns ratio between primary-side and secondary-side winding of greater than one, in particular 10:1, for example. In this case, the turns ratio of the two secondary-side winding sections can, in particular, be one, that is to say that the two secondary-side winding sections have the same number of turns.

In this case, the primary-side winding of the transformer can be fed from two output connections of a four-quadrant converter 1. Here, the four-quadrant converter 1 can have, for example, four switching devices 1a, 1b, 1c, 1d in a full-bridge circuit. In this case, the switching devices 1a, 1b, 1c, 1d can have, for example, power semiconductor switches, such as field-effect transistors (FETs), for example. By way of example, the power semiconductor switches can be designed in each case as normally off n-MOSFETs (n-channel metal oxide semiconductor field-effect transistors, enhancement mode type), IGBTs (insulated-gate bipolar transistors), JFETs (junction field-effect transistors) or p-MOSFETs (p-channel metal oxide semiconductor field-effect transistors).

A supply voltage Ui can be applied, for example by a traction battery in a high-voltage electrical system of an electrically actuated vehicle or a hybrid vehicle, to the four-quadrant converter 1, for example via an intermediate-circuit capacitor 4. In this case, the supply voltage Ui can be a DC voltage of varying amplitude, with the result that the switching devices 1a, 1b, 1c, 1d of the four-quadrant converter 1 can be actuated such that the supply voltage Ui is converted into an AC voltage applied alternately to the input connections of the primary-side winding of the transformer 2.

On the secondary side, the two end taps of the respective secondary-side winding sections are connected to two inputs of a synchronous rectifier circuit 3. In this case, the synchronous rectifier circuit 3 comprises two switching devices 3a, 3b. Here, the switching devices 3a, 3b can have, for example, power semiconductor switches, such as FETs, for example. By way of example, the semiconductor switches can be designed in each case as normally off n-MOSFETs, IGBTs, JFETs or p-MOSFETs. In this case, the center tap of the secondary-side winding of the transformer can be routed through the synchronous rectifier circuit 3, with the result that a rectified and stepped-down DC voltage is present between the center tap and one of the respective end taps of the transformer at the output connections of the synchronous rectifier circuit 3. The DC voltage can in this case be routed as output voltage Uo of the DC-DC converter 10 via a secondary-side storage inductor 6 and used to operate a load 7. The secondary-side storage inductor 6 and an intermediate-circuit capacitor 5 which is coupled between the output connections of the synchronous rectifier circuit 3 constitute an output-side LC filter in this case, which smoothes the rectified output voltage of the synchronous rectifier circuit 3.

The synchronous rectifier circuit 3 is designed to tap a voltage present at the secondary side of the transformer 2 from the end taps of the respective secondary-side winding section and to convert said voltage into a DC voltage by means of suitable actuation of the switching devices 3a, 3b. In other words, during operation of the DC-DC converter 10, an output voltage Uo can be tapped between the output connections of the synchronous rectifier circuit 3, which voltage, depending on load demands, causes a current Jo in the storage inductor 6.

The primary-side switching devices 1a, 1b, 1c and 1d and the secondary-side switching devices 3a and 3b are actuated by means of pulse-width-modulated actuation signals. In this case, the pulse-width modulation can occur at a duty cycle D which is dependent on the turns ratio of the transformer 2 and on the ratio of the supply voltage Ui to the desired output voltage Uo. The duty cycle D can be designed such that a magnetic flux reserve is present, that is to say that a safety interval is present in each case between two switching processes of the switching devices 1a, 1b, 1c, 1d, during which safety interval the magnetic flux in the transformer 2 can be reduced. If the supply voltage Ui then falls, it is necessary to increase the duty cycle D in the case of an output voltage Uo which remains constant. In these circumstances, it can be possible for the duty cycle D to be increased such that a magnetic flux reserve is decreased, that is to say that no time remains for demagnetization of the transformer 2. This is a particular problem since the switching devices 1*a*, 1*b*, 1*c*, 1*d* are subject to variations owing to manufacture and aging and therefore the power input into the primary-side windings of the transformer 2 cannot take place symmetrically. Without demagnetization of the transformer 2, saturation of the transformer 2 can therefore occur after several operating cycles which, owing to the resulting rapidly reducing magnetic inductance of the transformer 2, can lead to high currents in the switching devices 1*a*, 1*b*, 1*c*, 1*d* and irreparably damage same.

Furthermore, the DC-DC converter 10 is usually operated in continuous current mode (CCM), that is to say that the current Jo in the storage inductor 6 does not fall below a lower current threshold during the course of one operating cycle. For this purpose, for example, a shunt resistor—not illustrated—can be provided between the synchronous rectifier circuit 3 and the load 7, at which shunt resistor the output current of the synchronous rectifier circuit 3 can be measured.

Figure 4:
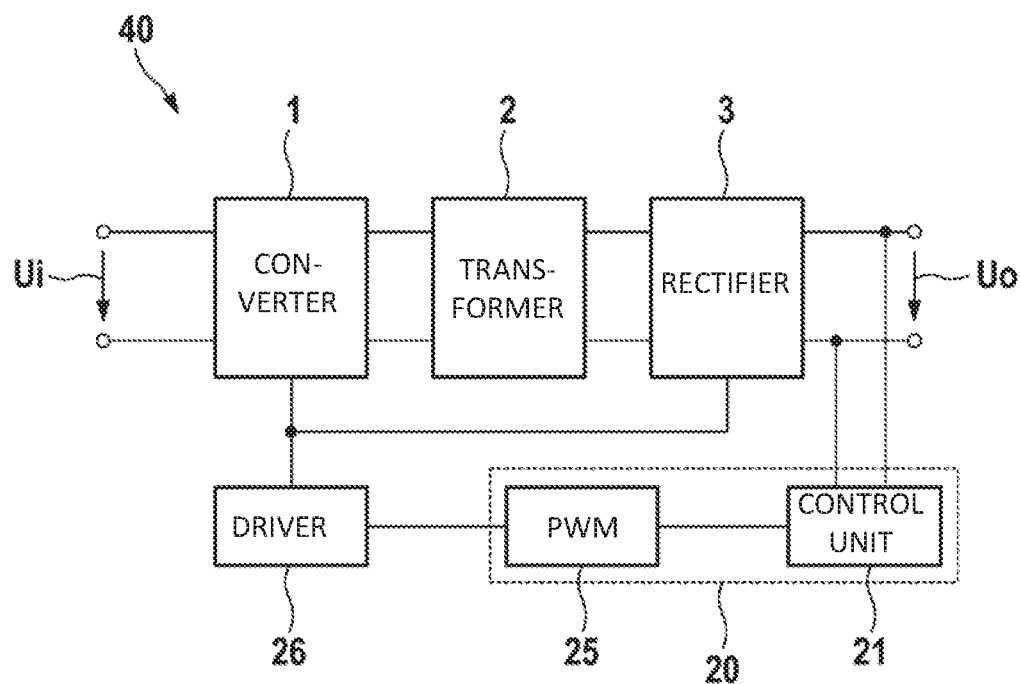
FIG. 4 shows a schematic illustration of a system with a DC-decoupled DC-DC converter and an associated actuation device according to another embodiment of the invention.

FIG. 4 shows a schematic illustration of a system 20 having a DC-DC converter. In this case, the DC-DC converter can be constructed in a similar manner to that shown in FIG. 1 and have a four-quadrant converter 1, which is supplied with a supply voltage Ui. The four-quadrant converter 1 is connected to a transformer 2 which in turn is coupled to a synchronous rectifier circuit 3. An output DC voltage Uo can be tapped off at the output connections of the synchronous rectifier circuit 3. At the same time, operating parameters of the DC-DC converter can be determined at the output connections of the synchronous rectifier circuit 3, for example the level of the output voltage Uo or the output current strength Jo of the synchronous rectifier circuit 3.

In this case, the operating parameters can be detected by a control unit 21. The control unit is shown in more detail in FIG. 2. The control unit 21 is designed to detect the operating parameters and, on the basis thereof, to generate actuation signals for a pulse-width-modulation device 25. The pulse-width-modulation device 25 generates pulse-width-modulated actuation signals on the basis of the actuation signals received by the control unit 21, which pulse-width-modulated actuation signals are passed to a driver device 26 which drives the switching devices of the four-quadrant converter 1 and of the synchronous rectifier circuit 3.

Figure 2:
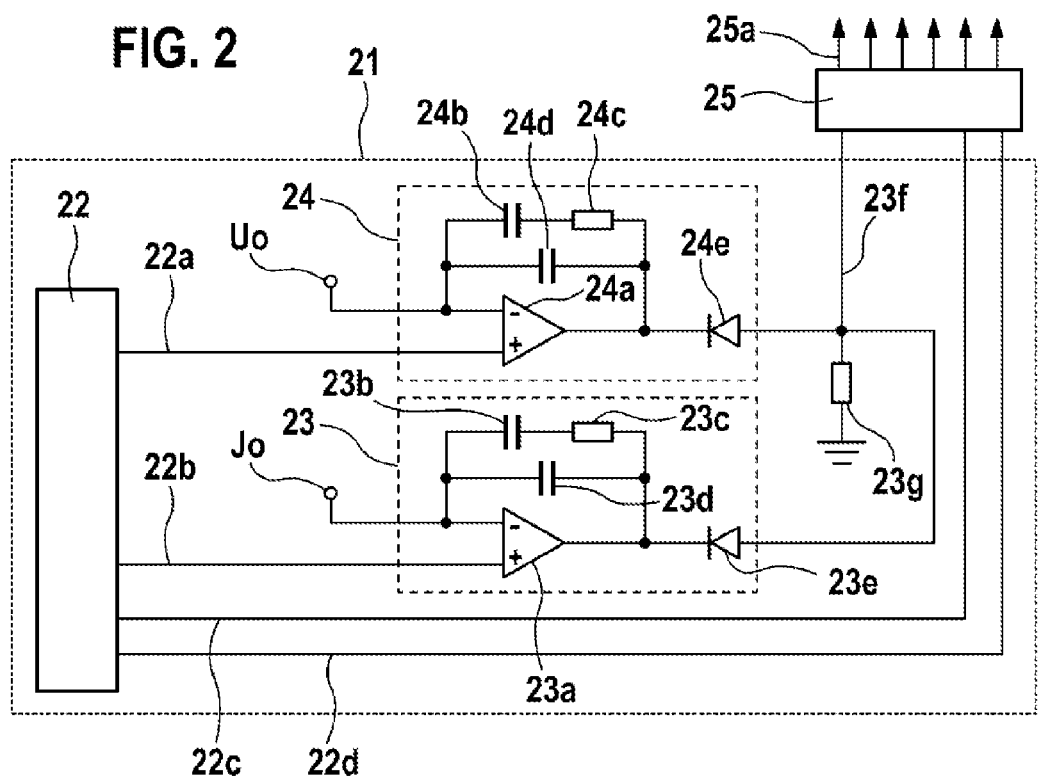
FIG. 2 shows a schematic illustration of an actuation device for a DC-decoupled DC-DC converter according to another embodiment of the invention.

FIG. 2 shows a schematic illustration of a control unit 21 according to FIG. 4 in more detail. In this case, the control unit 21 has a signal-generating device 22 which is designed to generate control signals for switching devices 3*a*, 3*b* of the synchronous rectifier circuit 3 in FIG. 1. The signal-generating device 22 can be, for example, a microprocessor, a microcontroller, an ASIC, an FPGA, an integrated circuit or a similar control device. The signal-generating device 22 is designed to generate a control signal 22*c* for disconnecting the switching devices 1*a*, 1*b*, 1*c*, 1*d* of the four-quadrant converter 1 and to generate a control signal 22*d* for disconnecting the switching devices 3*a*, 3*b* of the synchronous rectifier circuit 3.

The signal-generating device 22 can be designed to generate a reference current signal 22*b* and a reference voltage signal 22*a*. The reference current signal 22*b* can be used in this case to limit the output current Jo of the synchronous rectifier circuit 3, that is to say that the actuation signals of the control unit 21 for the switching devices 3*a*, 3*b* of the synchronous rectifier circuit 3 are configured such that the output current Jo of the synchronous rectifier circuit 3 does not exceed the value of the reference current signal 22*b*. Similarly, the reference voltage signal 22*a* can be used in this case to limit the output voltage Uo of the synchronous rectifier circuit 3, that is to say that the actuation signals of the control unit 21 for the switching devices 1*a*, 1*b*, 1*c*, 1*d* of the four-quadrant converter 1 are configured such that the output voltage Uo of the synchronous rectifier circuit 3 does not exceed the value of the reference voltage signal 22*a*.

The control unit 21 also has a first comparator device 23 which is coupled to the signal-generating device 22 and which is designed to detect the secondary-side output current Jo of the synchronous rectifier circuit 3. The first comparator device 23 is also designed to compare the secondary-side output current Jo with the reference current signal 22*b* and to generate a current control signal on the basis of the comparison. The first comparator device 23 can have an operational amplifier 23*a* which receives as signal inputs the detected output current Jo at the inverting input and the reference current signal 22*b* at the non-inverting input. The output signal of the operational amplifier 23*a* can be fed back to the inverting input of the operational amplifier 23*a* via a feedback path having a capacitor 23*d* connected in parallel with a series connection composed of a capacitor 23*b* and a nonreactive resistor 23*c*. A diode 23*e* can be provided at the output connection of the first comparator device 23*a*. The first comparator device 23*a* can be coupled via a nonreactive resistor 23*g* to a ground potential on one side and to a pulse-width-modulation device 25 on the other side.

The control unit 21 also has a second comparator device 24 which is coupled to the signal-generating device 22 and which is designed to detect the secondary-side output voltage Uo of the synchronous rectifier 3. The second comparator device 24 is also designed to compare the secondary-side output voltage Uo with the reference voltage signal 22*a* and to generate a voltage control signal on the basis of the comparison. The second comparator device 24 can have an operational amplifier 24*a* which receives as signal inputs the detected output voltage Uo at the inverting input and the reference voltage signal 22*a* at the non-inverting input. The output signal of the operational amplifier 24*a* can be fed back to the inverting input of the operational amplifier 24*a* via a feedback path having a capacitor 24*d* connected in parallel with a series connection composed of a capacitor 24*b* and a nonreactive resistor 24*c*. A diode 24*e* can be provided at the output connection of the second comparator device 24*a*. The second comparator device 24*a* can be coupled to the output connection of the first comparator device 23 and via a nonreactive resistor 23*g* to a ground potential on one side and to a pulse-width-modulation device 25 on the other side. The first and second comparator devices 23 and 24 together output on the signal line 23*f* an output signal to the pulse-width-modulation device 25.

The pulse-width-modulation device 25 can be coupled to the signal-generating device 22 and to the comparator devices 23, 24. The pulse-width-modulation device 25 is designed to generate pulse-width-modulated actuation signals 25*a* for the switching devices of the synchronous rectifier 3 and/or the four-quadrant converter 1 on the basis of the control signals 22*c*, 22*d*, the current control signal of the first comparator device 23 and, optionally, the voltage control signal of the second comparator device 24.

Figure 3:
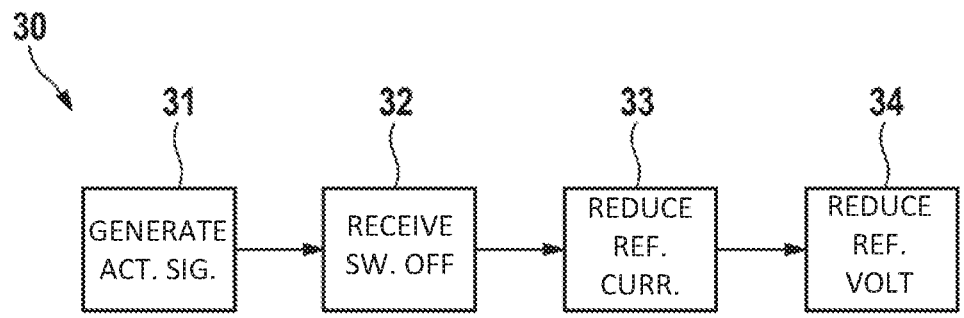
FIG. 3 shows a schematic illustration of a method for actuating a DC-decoupled DC-DC converter with synchronous rectifier according to another embodiment of the invention.

The operation of the control unit 21 will be explained in more detail in the following text with reference to the method 30 for actuating a DC-decoupled DC-DC converter, for example the DC-DC converter 10 shown in FIG. 1, having a synchronous rectifier, which method is illustrated schematically in FIG. 3.

In a first step 31, pulse-width-modulated actuation signals for the switching devices 3a, 3b of the synchronous rectifier 3 can be generated on the basis of the reference current signal 22b. In this case, the reference current signal 22b limits the output current Jo of the synchronous rectifier 3. Pulse-width-modulated actuation signals for primary-side switching devices of the DC-DC converter 10, for example for the switching devices 1a, 1b, 1c, 1d of the four-quadrant converter 1, can also be generated in step 31 on the basis of the reference voltage signal 22a. In this case, the reference voltage signal 22a has a value which limits the output voltage Uo of the synchronous rectifier 3.

In a step 32, the signal-generating device 22 can receive a switch-off signal for the DC-DC converter 10. Subsequently, in a step 33, the signal-generating device 22 can reduce the reference current signal 22b to a predetermined reference current threshold value within a first predetermined time period, for example within a few milliseconds. When the DC-DC converter 10 is switched off, the supply voltage Ui is reduced. If the output current Jo of the synchronous rectifier circuit 3 remains constantly high, then the energy transfer via the transformer 2 is no longer sufficient to maintain the flow of current through the storage inductor 6 during an operating cycle, that is to say that the flow of current through the storage inductor 6 falls to zero. This means that the DC-DC converter 10 would then be operated in discontinuous current mode.

In order to avoid this, the output current Jo of the synchronous rectifier circuit 3 is reduced with the fall in the supply voltage Ui, with the result that the DC-DC converter 10 can be operated in the continuous current mode (CCM) throughout the entire disconnection process. This avoids return flows of the current through the storage inductor 6 and consequent flows of current through the switching devices 3a, 3b. The flow of current through the switching devices 3a, 3b occurs, for example, only through the intrinsic diode ("body diode") of the power semiconductor switches 3a, 3b. After the first predetermined time period, the signal-generating device 22 can generate the control signal 22d such that the switching devices 3a, 3b are completely switched off.

If a low-voltage battery or another DC voltage source is connected to the output connections of the synchronous rectifier circuit 3, the switching devices 1a, 1b, 1c, 1d of the four-quadrant converter 1 can also be switched off after the first predetermined time period, for example by virtue of the signal-generating device 22 generating the control signal 22c as appropriate.

Otherwise, in a step 34, once the switch-off signal has been received, the signal-generating device 22 can reduce the reference voltage signal 22a to a predetermined reference voltage threshold value within a second predetermined time period. As a result, the relationship between the supply voltage Ui, which becomes smaller during the switch-off process, and the output voltage Uo, which becomes smaller owing to the reference voltage signal 22a, can be kept exactly or almost exactly constant. This means that the duty cycle D of the pulse-width modulation can likewise be kept constant or almost constant, with the result that it is possible to prevent the maximum possible duty cycle D from being reached. This prevents the transformer 2 from reaching saturation and, as a result, currents which are high and potentially damaging to the operability of the switching devices 1a, 1b, 1c, 1d flowing through the switching devices 1a, 1b, 1c, 1d.

By means of the method 30 for actuating a DC-decoupled DC-DC converter, for example the push-pull forward converter in FIG. 1, it is possible to effectively avoid the occurrence of a discontinuous current mode of the DC-DC converter 10 and the saturation of the transformer 2 during a switch-off process when the supply voltage Ui falls below a critical value. However, it is not necessary to arrange a separate undervoltage detection device or a separate low-load-current detection device in the actuation device for this purpose. This reduces the number of necessary components of the actuation device and hence the efficiency of the actuation device is increased. At the same time, the reliable and safe operation of the DC-DC converter is not compromised owing to the adaption of the reference values to the output current Jo and/or the output voltage Uo of the DC-DC converter.

The invention claimed is:

1. An actuation device (20) for a DC-decoupled DC-DC converter (10) having a synchronous rectifier (3), the actuation device (20) comprising:
   a signal-generating device (22) configured to generate control signals for switching devices (3a, 3b) of the synchronous rectifier (3) and a reference current signal (22b);
   a first comparator device (23) coupled to the signal-generating device (22) and configured to detect the secondary-side output current (Jo) of the synchronous rectifier (3), to compare said secondary-side output current with the reference current signal (22b) and to generate a current control signal on the basis of the comparison; and
   a pulse-width-modulation device (25), coupled to the signal-generating device (22) and to the first comparator device (23) and configured to generate pulse-width-modulated actuation signals (25a) for the switching devices (3a, 3b) of the synchronous rectifier (3) on the basis of the control signals and the current control signal,
   wherein the signal-generating device (22) is also configured to reduce the reference current signal (22b) to a predetermined reference current threshold value within a first predetermined time period; and
   wherein the pulse width modulation activation signals have a duty cycle in which a safety interval is provided, during which the magnetic flux in the transformer (2) is reduced.

2. The actuation device (20) as claimed in claim 1, wherein the pulse-width-modulation device (25) is also configured to generate the pulse-width-modulated actuation signals (25a) such that the secondary-side output current (Jo) of the synchronous rectifier (3) is limited by the value of the reference current signal (22b).

3. The actuation device (20) as claimed in claim 1, wherein the DC-decoupled DC-DC converter (10) is a bidirectional push-pull forward converter having a primary-side full-bridge circuit (1).

4. The actuation device (20) as claimed in claim 1, wherein the signal-generating device (22) is also configured to receive a switch-off signal for the DC-DC converter (10).

5. The actuation device (20) as claimed in claim 4, wherein the signal-generating device (22) is also configured to reduce the reference current signal (22b) to the predetermined reference current threshold value once the switch-off signal has been received.

6. The actuation device (20) as claimed in claim 4, wherein the signal-generating device (22) is also configured to generate a reference voltage signal (22a) and to reduce the reference voltage signal (22a) to a predetermined reference voltage threshold value within a second predetermined time period;
   wherein the actuation device (20) also comprises a second comparator device (24) coupled to the signal-generating device (22) and configured to detect the secondary-side output voltage (Uo) of the synchronous rectifier (3), to compare said secondary-side output voltage with the reference voltage signal (22a) and to generate a voltage control signal on the basis of the comparison; and
   wherein the pulse-width-modulation device (25) is also configured to generate pulse-width-modulated actuation signals (25a) for the primary-side switching devices (1a, 1b, 1c, 1d) of the DC-DC converter (10) on the basis of the voltage control signal.

7. The actuation device (20) as claimed in claim 6, wherein the signal-generating device (22) is also configured to reduce the reference voltage signal (22) to the predetermined reference voltage threshold value once the switch-off signal has been received.

8. A system (40), comprising:
   a push-pull forward converter (1, 2, 3) which comprises a primary-side four-quadrant converter (1), a transformer (2), a synchronous rectifier (3) and an LC filter (5, 6); and
   an actuation device (20) as claimed in claim 1, which is designed to generate pulse-width-modulated actuation signals (25a) for semiconductor switches (1a, 1b, 1c, 1d; 3a, 3b) of the four-quadrant converter (1) and the synchronous rectifier (3).

9. A method (40) for actuating a DC-decoupled DC-DC converter (10) having a synchronous rectifier (3), the method comprising:
   generating (31) pulse-width-modulated actuation signals (25a) for switching devices (3a, 3b) of the synchronous rectifier (3) on the basis of a reference current signal (22b), the value of which limits an output current (Jo) of the synchronous rectifier (3);
   receiving (32) a switch-off signal for the DC-DC converter (10); and,
   once the switch-off signal has been received, reducing (33) the reference current signal (22b) to a predetermined reference current threshold value within a first predetermined time period; and
   wherein the pulse width modulation activation signals have a duty cycle in which a safety interval is provided, during which the magnetic flux in the transformer (2) is reduced.

10. The method (40) as claimed in claim 9, further comprising:
   generating (31) pulse-width-modulated actuation signals (25a) for primary-side switching devices (1a, 1b, 1c, 1d) of the DC-DC converter (10) on the basis of a reference voltage signal (22a), the value of which limits an output voltage (Uo) of the synchronous rectifier (3); and,
   once the switch-off signal has been received, reducing (34) the reference voltage signal (22a) to a predetermined reference voltage threshold value within a second predetermined time period.

* * * * *